United States Patent [19]

Andersson

[11] Patent Number: 4,562,053

[45] Date of Patent: Dec. 31, 1985

[54] PROCESS OF CLEANING FLUE GASES FROM HEATING PLANTS

[75] Inventor: Finn Andersson, Greve Strand, Denmark

[73] Assignee: Desco K/S, Copenhagen, Denmark

[21] Appl. No.: 413,350

[22] PCT Filed: Dec. 22, 1981

[86] PCT No.: PCT/DK81/00118

§ 371 Date: Aug. 23, 1982

§ 102(e) Date: Aug. 23, 1982

[87] PCT Pub. No.: WO82/02151

PCT Pub. Date: Jul. 8, 1982

[30] Foreign Application Priority Data

Dec. 23, 1980 [DK] Denmark ............................ 5527/80

[51] Int. Cl.[4] .................... C01B 21/00; C01B 17/00
[52] U.S. Cl. ................................. 423/235; 423/242;
    55/73; 55/257 HE; 261/149
[58] Field of Search ............... 423/242 A, 242 R, 235;
    55/73, 257 HE; 261/149

[56] References Cited

U.S. PATENT DOCUMENTS

| | | | |
|---|---|---|---|
| 3,473,298 | 10/1969 | Berman | 55/257 HE |
| 3,733,393 | 5/1973 | Couillaud et al. | 423/242 X |
| 3,733,777 | 5/1973 | Huntington | 423/242 |
| 4,009,244 | 2/1977 | Atsukawa et al. | 423/242 |
| 4,038,367 | 7/1977 | Atsukawa et al. | 423/242 |
| 4,194,889 | 3/1980 | Wanner | 55/257 HE |
| 4,284,609 | 8/1981 | deVries | 423/242 |
| 4,340,572 | 7/1982 | Ben-Shmuel et al. | 423/242 |

FOREIGN PATENT DOCUMENTS

1324 6/1980 Denmark .

*Primary Examiner*—Gregory A. Heller
*Attorney, Agent, or Firm*—Oblon, Fisher, Spivak, McClelland & Maier

[57] ABSTRACT

By a process of cleaning flue gases, both solid particles and nitrogen oxides and sulphur dioxide are removed from the flue gas prior to the discharging into the atmospheric air. In order to ensure that almost all the content of sulphur dioxide and nitrogen oxides is removed from the flue gas, said flue gas is initially carried through a shower of aqueous liquid and subsequently through a heat exchanger, in which its temperature is lowered to about 20°–30° C., and then through a film of alkaline liquid, and finally through a second shower of aqueous liquid to pass a sulphuric acid neutralizing liquid in a container before the discharging into the atmospheric air. As a result a simultaneous possibility of utilizing the heat of the flue gas is ensured by means of the heat exchanger. A cleaning plant for carrying out the process comprises an apparatus (2), through which the flue gas cleaned of solid particles is carried. When seen in the flow direction, this apparatus comprises a first flue scrubber (8), in which the flue gas is subjected to a shower of liquid, a two-step heat exchanger (9, 10) permitting a reduction of the temperature of the flue gas to 20°–30° C. After the two-step heat exchanger (9, 10), the apparatus (2) comprises a rotating, conical disc (11) providing a film of milk of lime, through which the flue gas is forced to pass during the continuous flow through the apparatus. After this film of milk of lime, the flue gas passes a shower of liquid emitted from a second flue scrubber (14), and upon said scrubber the flue gas is forced to pass a limy liquid in a container (15).

6 Claims, 2 Drawing Figures

PROCESS OF CLEANING FLUE GASES FROM HEATING PLANTS

TECHNICAL FIELD

The invention relates to a process of cleaning flue gases from heating plants such as oil burners, whereby it is substantially ensured that solid particles such as fly ash are initially removed from the flue gas, whereafter nitrogen oxides and sulphur dioxide are removed from the flue gas prior to the discharging to the atmospheric air, optionally through a neutralizing device. The invention furthermore relates to a plant for carrying out the process.

BACKGROUND ART

It is known to clean flue gases both of solid particles and of nitrogen oxides and sulphur dioxide, and it is known to utilize the heat of the flue gas. The previously known plants ensure a reduction of about 90% of the amount of sulphur dioxide in the flue gas. The remaining amount of sulphur dioxide assures that the flue gas discharged into the atmospheric air is particularly aggressive, said flue gas usually being discharged at a temperature of about 60°–70° C.

DISCLOSURE OF INVENTION

The object of the invention is to provide a process ensuring a reduction of the amount of sulphur dioxide of 98-100% at the same time as the flue gas is cooled almost to room temperature.

The process according to the invention is characterised in that initially the flue gas cleaned of solid particles is carried through an optionally intermittent, first shower of aqueous liquid, subsequently through a heat exchanger, in which the temperature of the flue gas is reduced to about 20°–30° C., optionally through a film of an alkaline liquid such as milk of lime or chloride of lime, through a second shower of aqueous liquid, and finally through a sulphuric acid neutralizing liquid in a container prior to the exhaust to the atmospheric air or an additional neutralizing device.

As a result, the discharged flue is cleaned to such an extent that it is comparable with the atmospheric air as to the content of combustion gases. The content of sulphur dioxide and sulphuric acid is almost completely removed, i.e. only from 0 to 2% thereof remain. Only a small amount of nitrogen and carbon dioxide remain, and the result of the cleaning is that the expenses involved in building large chimneys are completely avoided. At the same time the heat of the flue gas can be completely utilized as low as to 20°–30° C. for heating purposes since a temperature of at least about 150° C. to 160° C. in the flue gas is no longer required during the passage of said flue gas through a chimney. This high temperature was necessary in connection with the previous plants in order to ensure that the content of sulphuric acid of the flue gas did not turn aggressive within the chimney. This effect is due to a co-operation of the various liquids and the great reduction of the temperature which the flue gas is subjected to. A reduction of the temperature of the partly cleaned flue gas after the first treatment with a shower of aqueous liquid involves an intensely accelerating effect concerning the conversion of $SO_2$—$SO_3$ into $H_2SO_3$ and $H_2SO_4$. The film with alkaline liquid ensures a neutralization of the previously formed $H_2SO_4$ and an oxidation of present nitrogen oxides. The later shower of aqueous liquid ensures a conversion of the remaining amounts of $SO_2$ and $SO_3$ into $H_2SO_3$ and $H_2SO_4$ being removed during the passage through the sulphuric acid neutralizing liquid in a container before the discharging into the atmospheric air. As an additional security measure, the flue gas cleaned may optionally pass through an additional neutralizing device. The low temperature of the cooled flue gas ensures an essential increase of the capacity of the sulphur dioxide of being absorbed in the amount in question of aqueous liquid. By a usual liquefaction of sulphur dioxide at 0° C. with water, the dissolving or absorbing is carried out with the following ratios, viz. 1 part of water to 80 parts of $SO_2$, and each time an increase of temperature of 20° C. takes place, the number of parts of $SO_2$ is halved. The present 20°–30° C. of the flue gas thus implies that considerably higher amounts of $SO_2$ can be absorbed by the aqueous liquid than in the previously known plants, whereby the consumption of aqueous liquid is relatively low compared to usual scrubbers operating at temperatures of about 70° C. to 80° C.

The heat exchanger permits heating of for instance water for district heating or of boiler water, as well as a preheating of air for combustion. The preheating of the air for combustion improves the combustion, said combustion being improved by 1.4% per 10° increase of the temperature of the air for the combustion. The loss of heat from the plant is thereby very low compared to the loss occurring in connection with plants with chimneys. The lower amount of necessary liquid renders it possible to make the plant necessary for carrying out the process very small and compact. Furthermore, the higher efficiency per $m^3$ of flue gas and the efficient utilization of the heat reduce the working expenses.

According to the invention the flue gas may together with the first shower of liquid be carried in a substantially vertical direction downwards through the heat exchanger until it is contacted with the film of alkaline liquid and the second shower of liquid. As a result it is possible to utilize the gravity efficiently and to obtain a particularly good heat transition to the heat exchanger.

Furthermore according to the invention, the liquid of the first and the second shower of aqueous liquid may be a mixture of water and hydrogen peroxide, whereby a particularly efficient oxidation of the sulphur dioxide into the sulphur trioxide is ensured.

According to the invention it is particularly preferred that the second shower of liquid is emitted in a direction opposite the flow direction of the gas.

The invention furthermore relates to a cleaning plant for carrying out the process, and this cleaning plant comprises an apparatus, in which it is ensured that solid particles such as fly ash are removed from the flue gas, and an apparatus for the removal of nitrogen oxides and sulphur dioxide from the flue gas, the latter apparatus optionally being coupled to a neutralizing device. This cleaning plant is according to the invention characterised in that the apparatus for the removal of nitrogen oxides and sulphur dioxide, when seen in the flow direction, comprises a first flue scrubber subjecting the passing flue gas to a shower of liquid, a two-step heat exchanger lowering the temperature of the flue gas to 20°–30° C. and comprising both a high temperature heat exchanger and a low temperature heat exchanger, whereby said high temperature heat exchanger is adapted to transfer heat from the flue gas to water such as boiler water or district heating water, and whereby said low temperature heat exchanger is adapted to transfer heat from the flue gas to air supplied to the combustion, that after the two-step heat exchanger means are located for spreading a film of supplied alkaline liquid such as milk of lime or chloride of lime across the apparatus on the place in question, and that a second flue scrubber is provided after these means, said second flue scrubber spraying a shower of liquid on the passing flue gas, and that the apparatus for the removal of nitrogen oxides and sulphur dioxide at the discharge end comprises a container provided with outlets and catching the liquid from the flue scrubbers and the means, and in which the flue gas is forced to pass the liquid present in the container before the discharging.

This cleaning plant operates particularly efficiently and when employing appropriate sensors and regulating means, a very reliable control of this plant is rendered possible. In this connection it is noted that the flue gas being treated as mentioned initially is cleaned of solid particles such as fly ash. This cleaning may be performed in many various manners, e.g. by means of a particle-separating apparatus in the form of a multicyclon or filters. In case of oil heating, the particle-separating apparatus may be replaced by an emulsion plant located in front of the oil burner. In this emulsion plant, the water is in a manner known per se emulsified in the oil in such a manner that the surface tension of the oil is changed, and a usual drop of oil is changed into about 10 to 20 small drops of oil within the burner. In this manner a better division into fine particles of the oil during the combustion is obtained, which implies that all carbon particles disappear from the flue gas and an optimum combustion is obtained.

According to the invention the high temperature heat exchanger may be adapted to cause a reduction of the temperature of the flue gas to about 70°-80° C., and the low temperature heat exchanger may be adapted to cause an additional reduction of the temperature of the flue gas to about 20°-30° C., whereby a particularly efficient utilization of the heat is obtained. Finally according to the invention, the first flue scrubber, the two-step heat exchanger, the means, and the second flue scrubber may be located successively and substantially vertically on top of each other with the first flue scrubber at the top, whereby the plant is particularly compact.

BRIEF DESCRIPTION OF DRAWING

The invention will be described below with reference to the accompanying drawing, in which.

BEST MODE FOR CARRYING OUT THE INVENTION

Figure 1:
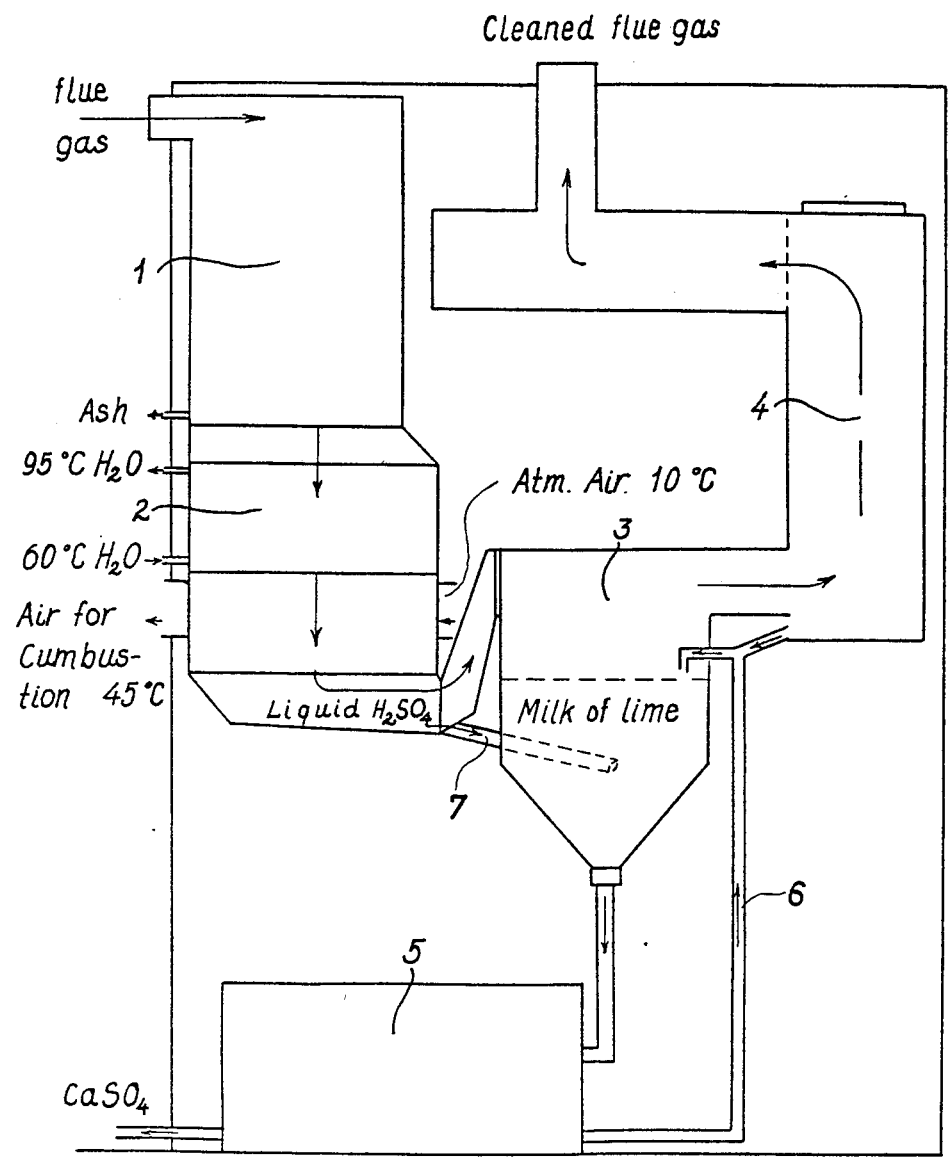
FIG. 1 is a diagrammatic view of a large flue gas cleaning plant for carrying out the process according to the invention, and FIG. 2 on a larger scale is a sectional view through part of the plant of FIG. 1.

The flue gas cleaning plant illustrated in FIG. 1 shows in succession a particle-separating apparatus 1, an apparatus 2 for the removal of sulphur dioxide and nitrogen oxides as well as for utilization of the heat of the flue gas, a neutralizing device 3, and a drop collector 4 such as a cyclone drop collector. From this drop collector, the flue gas flows directly into the atmosphere. The neutralizing device or optionally only the bottom of the apparatus 2 is downwardly connected to a separation apparatus 5 in which the milk of lime used within the neutralizing device and co-operating in neutralizing the sulphuric acid in the flue gas, is separated from $CaSO_4$ in a generally known manner. The hydrated calcium sulphate is discharged whereas the remaining milk of lime is returned through a pipe 6 for use in the cleaning plant, optionally during addition of fresh milk of lime. In the illustrated embodiment, the bottom of the apparatus 2 communicates as mentioned with the neutralizing device 3 through a pipe 7, whereby liquid collected at the bottom of the apparatus 2 can flow into the neutralizing device 3. Since it is only as a security measure that the plant according to the invention may be coupled to a neutralizing device, the connection 7 may be adapted to carry liquid directly downwards to the separation apparatus 5, which is a generally known type too such as a separator. The drop collector 4 removes possible residues of milk of lime from the cleaned flue gas prior to the discharging into the atmosphere.

Figure 2:
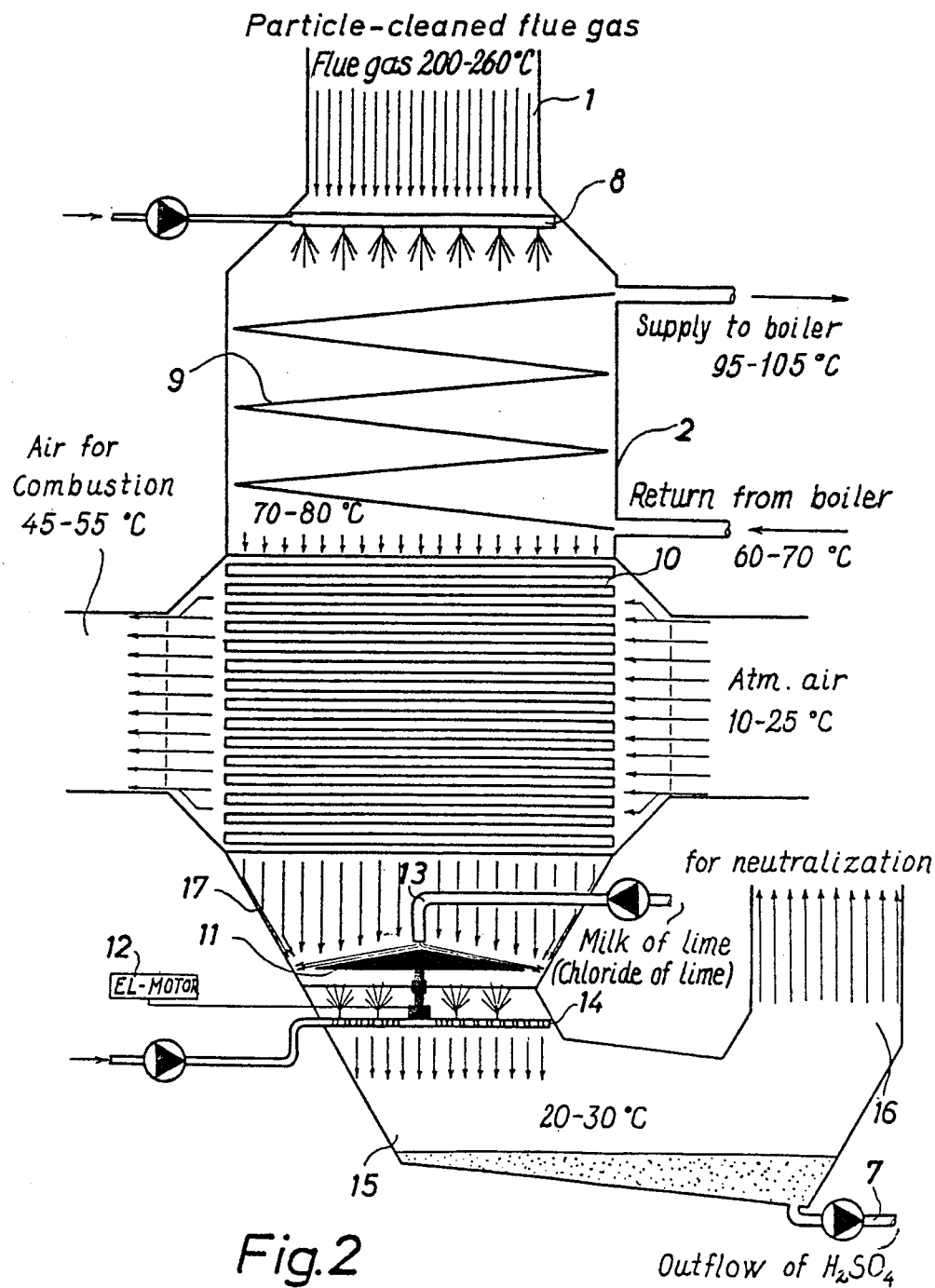

As illustrated in FIG. 2, which is a vertical, sectional view through the apparatus 2 for the removal of sulphur dioxide and nitrogen oxides and for the utilization of the heat of the flue gas, the flue gas flowing from the particle-separating apparatus is contacted with a first flue scrubber 8 at the inlet of the apparatus 2. This first flue scrubber is followed by a two-step heat exchanger comprising a high temperature heat exchanger 9 and a low temperature heat exchanger 10. A short distance below the low temperature heat exchanger 10, a conical disc 11 of a generally known type is located, and which by means of an electromotor 12 is caused to rotate. Immediately above the centre of this conical disc 11, a pipe 13 ends for the supply of an alkaline liquid such as milk of lime or chloride of lime to the rotating disc 11. The apparatus 2 ends in a container-forming bend 15 receiving liquid from the two flue scrubbers 8 and 14 and the rotating disc. Since this part of the apparatus 2 forms a bend, the flue gas is at an appropriately regulated liquid level forced to flow through the liquid collected in said bend before it flows out through the outlet 16 of the apparatus. As illustrated, the container-forming bend 15 is downwardly provided with outlets for the liquid collected, which is carried away through the previously mentioned pipe 7. The two flue scrubbers 8 and 14 are of any appropriate type adapted to spray a shower of water containing hydrogen peroxide on the passing flue gas, the flow direction of said flue gas everywhere being indicated by means of substantially vertical arrows. The first flue scrubber 8 furthermore sprays the shower of liquid on the low temperature heat exchanger, and together with the flue gas said liquid gives off heat to the water passing through a pipe system into a boiler or a district heating. Before flowing into the apparatus 2, the flue gas has a temperature of 200°-260° C., and upon passage through the high temperature heat exchanger said flue gas has a temperature of 70°-80° C., whereby the temperature of the water within the heat exchanger has risen to 95°-105° C. After the high temperature heat exchanger, the liquid and the flue gas are contacted with the low temperature heat exchanger preferably present in the form of a large number of transverse glass tubes preferably made of Pyrex glass ® standing up to high temperatures and sulphuric acid. Atmospheric air passes these glass tubes at 10°-25° C., and during the passage through the heat exchanger the temperature of said air is risen to 45°-55° C., whereby it is suited for use as air for the combustion. Having passed the low temperature heat exchanger, the temperature of the flue gas is 20°-30° C., and between the rotating disc and the wall 17 of the apparatus here being funnel-shaped, the flue gas is contacted with a film of milk of lime or chloride of lime emitted from the rotating disc so as immediately thereupon to be contacted with the shower of liquid from the second flue scrubber 14.

During the passage of the flue gas through the upper portion of the apparatus 2, i.e. the portion comprising the first flue scrubber 8 and the high temperature heat exchanger 9, part of the sulphur dioxide content is contacted with the water from the flue scrubber and converted into $H_2SO_3$, whereas other parts of the sulphur dioxide are oxidized by the hydrogen peroxide into $SO_3$ and subsequently converted into $H_2SO_4$ during the contact with the water. The water of the flue scrubber simultaneously ensures a continuous rinsing of the two heat exchangers. During the passage of the flue gas through the portion of the apparatus 2 comprising the low temperature heat exchanger 10, the temperature of said flue gas is as mentioned lowered to about 20°–30° C. At this temperature the capacity of the water of absorbing sulphur dioxide is greatly increased compared to the capacity thereof at higher temperatures. At 20° C., 40 volumes of $SO_2$ are dissolved in one volume of water. At the present temperatures, a high degree of dissolving is therefore ensured though the water consumption is very small. At the contact of the flue gas with the film of milk of lime or the like, a considerable part of the sulphuric acid now present in the flue gas is neutralized, and the present part of nitrogen is caught and oxidized. During the further flow of the flue gas past the second flue scrubber 14, the remaining amounts of $SO_2$ and $SO_3$ are caught and oxidized and converted into $H_2SO_4$. In the container-forming bend 15 of the apparatus, the flue gas is subsequently forced into intense contact with the limy liquid present therein, said liquid neutralizing the remaining residues of $H_2SO_4$. Subsequently, the flue gas flows out of the apparatus 2 through the outlet 16, and here the flue gas only comprises from 0 to about 2% of sulphur dioxide. This unusually low amount of sulphur dioxide can, if desired, be additionally reduced by means of the neutralizing device illustrated in FIG. 1.

The invention has been described with reference to a preferred embodiment. Many modifications may be performed without thereby deviating from the scope of the invention. The hydrogen peroxide used in the two flue scrubbers is a 3% hydrogen peroxide. The operation and capacity of the individual members such as the flue scrubbers and the rotating disc are adjusted in an appropriate manner by means of sensors and regulating means not shown.

The rotating disc may be replaced by other means for spreading an alkaline liquid.

What is claimed as new and desired to be secured by Letters Patent of the United States is:

1. A process for cleaning flue gases containing nitrogen oxides and sulphur dioxide from heating plants, said process comprising the sequential steps of:
    removing coarse solid particles from said flue gas;
    passing said flue gas through an intermittent first shower of aqueous liquid;
    immediately after, and immediately below, said step of passing said flue gas through an intermittent first shower of aqueous liquid, performing the step of reducing the temperature of said flue gas to between 20° and 30° C. by passing said flue gas and liquid from said first shower downward through a heat exchanger in which the flue gas does not directly contact a heat exchange fluid, whereby said aqueous liquid washes heat exchange surfaces of said heat exchanger;
    passing said flue gas through a second shower of aqueous liquid, whereby a portion of nitrogen oxides and sulphur dioxide in said flue gas are removed from said flue gas by said temperature reduction step and said first and second showers;
    passing said flue gas through a sulfuric acid neutralizing liquid immediately after said second shower; and
    discharging said flue gas to the atmosphere.

2. The process of claim 1 including the steps of:
    passing said flue gas through an alkaline liquid film between said heat exchanger and said second shower; and
    maintaining said sulfuric acid neutralizing liquid positioned immediately after said second shower within a container; and
    passing said flue gas through an additional sulphur dioxide neutralizing device between said sulphuric acid neutralizing liquid and said atmospheric discharging step.

3. A process as claimed in claim 2 wherein said flue gas together with said first shower of liquid is carried in a substantially vertical direction downwards through said heat exchanger until it is contacted with said film of alkaline liquid and said second shower of liquid.

4. A process as claimed in claim 1 or 3, wherein the liquid of the first and the second shower of aqueous liquid is a mixture of water and hydrogen peroxide.

5. A process as claimed in claim 1 or 3 wherein said second shower of liquid is emitted in a direction opposite a flow direction of the flue gas.

6. The process of claim 1 in which said first and second showers of aqueous liquid sprays said liquid on said heat exchanger.

* * * * *